Oct. 24, 1972     M. PERNET     3,700,424
WEIR-LIKE BODY EXTENDING FROM BELOW INTO A BODY
OF MOVING MOLTEN GLASS
Filed Dec. 24, 1969     3 Sheets-Sheet 1
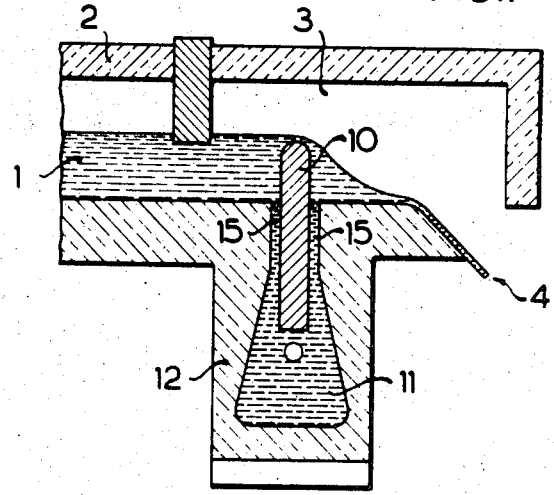
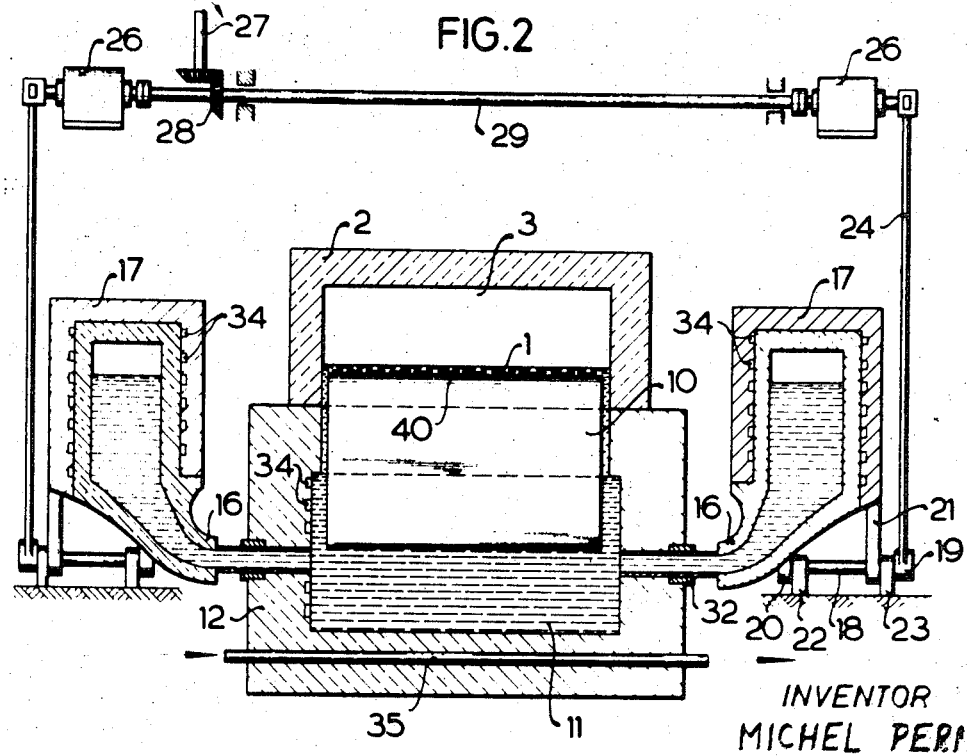
INVENTOR
MICHEL PERNET
BY Irving M. Weiner
ATTORNEY

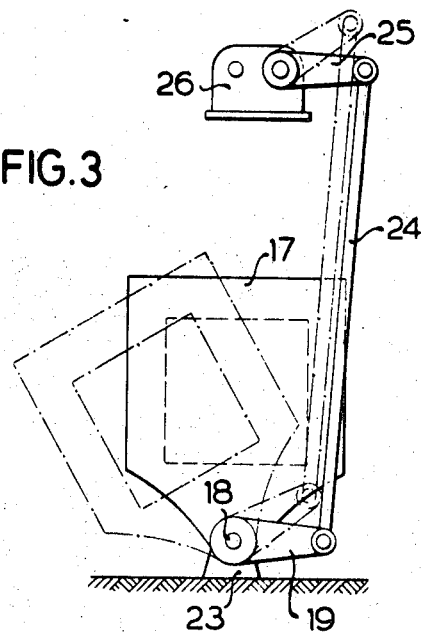
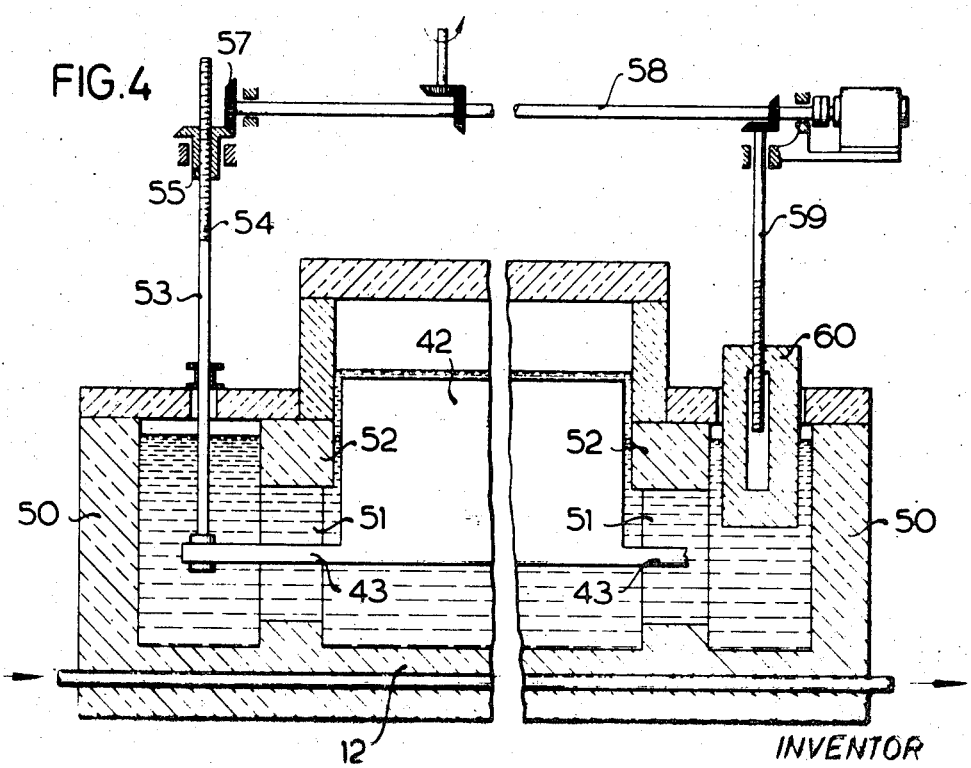

United States Patent Office 3,700,424
Patented Oct. 24, 1972

3,700,424
WEIR-LIKE BODY EXTENDING FROM BELOW INTO A BODY OF MOVING MOLTEN GLASS
Michel Pernet, Porz-Grengel, Germany, assignor to Erste Deutsche Floatglas G.m.b.H. & Co. OHG, Porz-Cologne, Germany
Filed Dec. 24, 1969, Ser. No. 887,998
Claims priority, application Germany, Jan. 4, 1969,
P 19 00 389.5
Int. Cl. C03b 5/26
U.S. Cl. 65—333                                    9 Claims

ABSTRACT OF THE DISCLOSURE

A weir-like body extending from below into a body of moving molten glass is supported in a mass of molten material underneath the glass so as to allow vertical adjustment of the position of the body.

BACKGROUND OF INVENTION

(1) Field of invention

The present invention relates to arrangements for supporting a refractory body extending upwards into a mass of molten glass, for example, a weir regulating the flow of glass from a glass melting furnace.

(2) Prior art

In the melting of glass in a tank furnace the transfer of the glass and/or its further processing in a stream the problem often arises of arranging refractory bodies acting as barriers, partitions or weirs within the glass mass. In this respect it is often desirable to arrange for such bodies to be adjustable in height while at the same time providing for a liquid-tight joint between the refractory body and the bottom part of the vessel containing the molten glass. In order to achieve this, there has been the previous proposal to arrange the body in an opening in the bottom of the vessel, within which the body can slide upwards and downwards.

A known construction of such a vertically adjustable body is described in the German specification 1,226,753. This patent specification relates to a weir in which the moving part consists of a hallow body of flattened cross section which is capable of being slid in a vertical plane or in a plane inclined to the vertical so that the hollow body remains parallel to itself. The movable part or weir thus slides between the flat and parallel surfaces of fixed parts of refractory ceramic material.

In the case of this known arrangement substantial difficulties occur in practical operation. The molten glass penetrates into the joints or gaps between the moving body and the stationary parts, and solidifies here to such an extent that movement of the body is prevented and the required adjustment in a vertical direction cannot be understaken. If an attempt is made to overcome these difficulties by heating the parts in question to such an extent that the glass remains liquid in the joint gaps, substantial further difficulties occur such as the formation of gas bubbles, and leakages.

SHORT SUMMARY OF INVENTION

One object of the present invention is to avoid the above-mentioned disadvantages and to construct the apparatus in such a manner that a satisfactory fine adjustment of the height of the body can be carried out at any time.

The aim of the invention can be achieved by providing, below the glass at a position adjacent to the refractory body, a container filled with a molten material having a higher density than the molten glass, for instance a liquid metal such as tin, whose level extends as far as the undersurface of the liquid glass, the body being dipped in this molten liquid.

The molten liquid provides a satisfactory seal between the stationary parts of the bottom of the molten glass container and the moving body and, owing to its high density or specific gravity, prevents any penetration of liquid glass into the joint gaps between the body and the adjacent stationary parts.

The joint gaps can be made so broad that any contact between the body and the stationary parts is avoided. In this manner the body is only surrounded by liquid material so that no trouble is experienced through friction.

The vertical adjustment of the position of the body can in principle be carried out in different manners. Thus, in accordance with a first embodiment of the invention it is possible to make the body of a refractory material with a density lower than the liquid material into which the body is dipped, and to arrange for the body to be supported by floating in the liquid material while for regulating the height of the body the level of the liquid material suporting the body by buoyancy can be changed. In this case the modification of the level of the liquid can be carried out in various different ways, for example by means of vessels which are hydraulically connected with the bath of liquid material in the container and can be raised and lowered. Another possibility is to use a displacing plunger which dips into the bath of liquid material. A still further possibility is to vary the gas pressure at a position above the tin bath. Additionally it is possible to use arrangements familiar to those in the art.

In accordance with a further embodiment of the invention, a linkage is attached to the body for bringing about vertical adjustment of the body. The linkage extends out of the molten glass container and is used for controlling the vertical position. In this case the arrangement can be so constructed that outside the liquid material container, chambers which hydraulically communicate with it are provided while the refractory body has projections extending below the level of the tin bath into the chambers. The projections are connected with a linkage for controlling the vertical position. In accordance with another embodiment the body can be provided with projections extending from both sides and made of the same refractory material. These projections are also connected with a linkage. In this case the weir body has a U-shaped cross section and the liquid glass does not come into contact with the linkage.

Since in the case of a vertical adjusting means connected directly with the body the level of the liquid material bath changes with every height adjustment of the body, means can be provided with which these changes in level can either be reduced to such a level that the changes do not have any undesired effects or it is possible to provide additional means by which changes in level may be completely compensated for.

The reduction of changes in level to a tolerable extent can be achieved, for example, by constructing the apparatus so that the tin bath in which the weir body is mounted, or a further tin bath in hydraulic communication with the first-mentioned tin bath, has a comparatively large free surface so that the volume of tin displaced by adjustment of the height of the weir body is distributed over a large surface so that in accordance with the size of the free surface, the change in the vertical position of the level of the tin can only be a fraction of the vertical movement of the weir body.

A cancelling out of changes in height of the tin bath level can be brought about in various different manners, the same means being basically applicable as those described in connection with the vertical adjustment of a weir body floating in the tin bath. The devices provided for altering the liquid level can be coupled with the mechanical devices for adjustment of the height position of the body in such a manner that level compensation automatically occurs.

Finally it is convenient to provide devices for regulating the temperature of the bath of liquid material in which the body is mounted so that if necessary the liquid material bath can be heated sufficiently to prevent any obstruction in the free movement of the body.

BRIEF DESCRIPTION OF THE DRAWINGS

For explaining the invention reference is now made to various embodiments of it with reference to the accompanying drawings, all the drawings showing the application of the invention to a weir.

FIG. 1 shows the basic arrangement of an apparatus in accordance with the invention, shown in a section parallel to the direction of flow of molten glass.

FIG. 2 shows an apparatus in accordance with the invention in a section which is transverse in relation to the direction of flow of the glass melt with a first embodiment of an arrangement for regulating the level of the tin bath.

FIG. 3 is a side view of the arrangement shown in FIG. 2 for regulating the level of the tin bath.

FIG. 4 shows a further embodiment of the apparatus in accordance with the invention providing for a positive guidance of the weir and an automatic compensation of the tin bath level.

DESCRIPTION OF PREFERRED EMBODIMENTS

Figure 5:
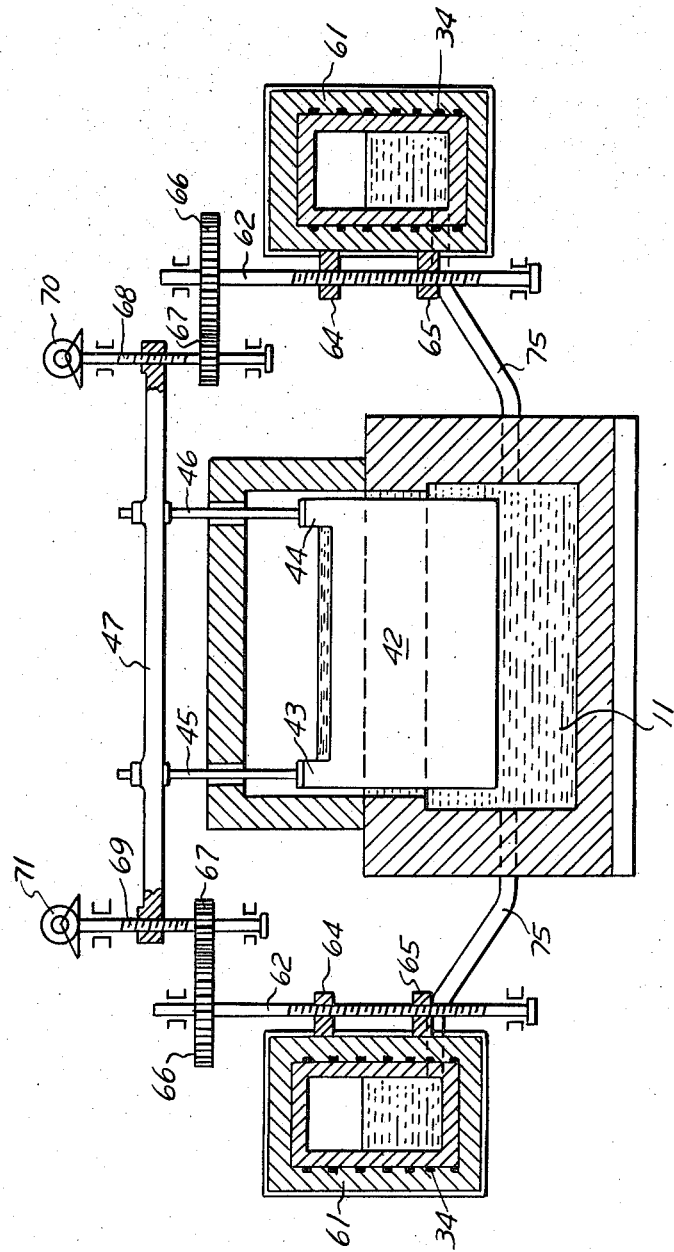
FIG. 5 shows an apparatus in accordance with the invention with a different embodiment for the guidance of the weir and automatic compensation of tin bath level.

FIG. 1 shows an example for the principal field of application of the invention, that is to say application of it to a weir. The molten glass 1 is supplied from the glass melting furnace 2 through a channel or feeder 3 to a processing station 4 which is not shown in detail. Within this channel or feeder the quantity of glass supplied per unit time to the processing station 4 from the melting furnace 2 is controlled with the aid of a weir 10. The weir 10 is mounted buoyantly in the bath 11 of liquid metal such as tin. The liquid bath 11 is contained in a suitably constructed container 12 of refractory material, which is arranged transversely underneath the channel 3.

The container 12 is made narrower in its upper part and forms with its two surfaces 15 a narrow gap within which the weir body 10 can move upwards and downwards in a vertical direction when the state of filling in the container 12 is varied. In this connection it should be pointed out that the gap determined by the positions of the surfaces 15 is so dimensioned that on all sides between the surfaces 15 and the weir body there is a sufficiently thick layer of liquid tin which acts as if it were as a lubricating film and prevents any direct contact between the weir body 10 and the walls of the container 12. In this manner a free movement of the weir body 10 is made possible in a vertical direction so that by changing the degree of filling of the container 12 the height position of the weir body can be adjusted.

In order to vary the degree of filling of the container 12 I provide, in accordance with the embodiment shown in FIG. 2, two tilting vessels 17 placed on the two sides of the container 12. These vessels are connected via ducts 16 on the bottom of the vessel 17 with the container 12. The vessels 17 can be tilted via mechanical means about the axis of the shaft 18. For this purpose the lever arm 19 is connected rigidly with the vessel 17 by means of a key between the lever arm 19 and the shaft 18 while the shaft 18 is connected with the projections 20 and 21 which are connected with the vessel 17. The shaft 18 turns in bearings 22 and 23. The position of the lever arm 19 is controlled by the linkage 24, 25 (FIG. 3), the linkage 25 being actuated by the step-down gearing 26. The step-down gearing 26 is in turn driven by the motor shaft 27 and the shaft 29 driven from it via bevel gearing 28. Thus on rotation of the drive shaft 27, the vessel 17 is swung about the shaft 18 lying below the vessel, the direction of movement of the vessel depending upon the direction of rotation of the shafts. Owing to this movement of the vessel the effective cross section is changed and simultaneously the vessel moves up or down. Owing to the hydraulic connection via the duct 16 tilting of the vessel 17 lowers the level of the tin bath 11 and part of the liquid tin flows into the vessel 17. The duct 16 is connected in a liquid-tight manner by the seal 32 with the container wall, the seal 32 permitting the necessary rotation of the duct 16.

Within the container walls and within the container 12 electrical heating elements 34 are arranged with whose aid the tin can be held at a temperature above the melting point. Such heating elements are also provided within the vessels 17. Furthermore, in the bottom part of the container 12 tubular ducts 35 are provided which can have coolant passed through them if this should be desired.

FIG. 4 shows an embodiment of the invention in which the vertical position of the weir 42 can be set by means of additional mechanical means, the mechanical means being so arranged that without touching the glass melt located above the weir 42 and without causing any leakages of the liquid tin, they are passed to the outside. For this purpose to the sides of actual container 12 containers 50 are arranged for the liquid bath in which the weir 42 is placed. These containers 50 are connected via slot-like openings 51 in the walls 52 with the container 12. The weir 42 has extensions or projections 43 projecting to its sides from its bottom and these projections extend through the openings 51 into the containers 50. The ends of the projections 43 are connected with the linkage 53 for regulating the weir vertically. At its upper end, linkage 53 is provided with a thread 54 and is fitted into a nut 55 which in turn is driven from the shaft 58 via the pair of bevel grears 57.

The threaded shaft 59 is also driven from the shaft 58. The shaft 59 is connected with the plunger 60 which dips into the liquid tin in the container 50. By rotation of the threaded shaft 59 during the upward or downward movement of the weir 42, the plunger 60 is moved in the opposite direction to the weir. The volume of the weir and of the plunger and/or the velocity ratio of the drives rotating the threaded shafts are so matched that the level of the tin bath remains unchanged during a vertical adjustment of the position of the weir.

Finally FIG. 5 shows a further possible embodiment of the invention in which the rods or linkage 45, 46 is connected with the upper end of the weir 42. The weir 42 has for this purpose lateral projections 43 and 44 in its upper part and made of the same material as the weir. This provides for a U-shaped recess for the passage of the flow of glass. Rods 45 and 46 are attached to the projections 43 and 44 and in turn these rods are connected with the cross piece 47. The cross piece 47 is provided at both ends with threaded holes into which cooperating threaded shafts 68 and 69 are fitted. Furthermore for regulating the level of the tin bath 11, two vertically moving vessels 61 are provided which with the aid of the rotary threaded shafts 62 can be set at the desired height. For this purpose projections 64 and 65 provided with threaded holes are provided on the vessels 61 and have threaded shafts 62 fitted into them. The threaded shafts 62 are driven from motors 70 and 71 via the gear wheels 66 and 67 via the threaded shafts 68 and 69. The motors are arranged to run at the same speed. The vessels 61 are connected via the ducts 75 with the tin bath 11 hydraulically. In a manner similar to FIG. 4 the movement of the weir is mechanically ganged with the movement of the vessels 60 so that a compensating system is provided which automatically compensates for raising and lowering of the weir and prevents changes in level of the tin bath 11.

In accordance with a further method for regulating the level of liquid material in the container, the container is connected with a vessel or two vessels which contain molten tin and are gas-tight. In order to correct the level in the container betwen the faces 15, gas is passed into the gas-tight vessels or removed from them.

The container can be provided with means for transfer of heat such as heating or cooling devices. Such devices include electrical resistance heating elements or induction heating devices. It is also possible to use cooling coils.

What I claim is:

1. An apparatus for supporting a refractory body, which extends upwardly into a stream of molten glass, to allow vertical adjustment of the position of said refractory body, said apparatus comprising; a container, a bath of a molten material, with a density greater than that of the density of said stream of molten glass, in said container, said molten material extending up as far as the undersurface of said molten glass, said refractory body dipping into said molten material, mechanical means connected to said refractory body for raising and for lowering said refractory body for adjusting the vertical position thereof with respect to said stream of molten glass, means for removing molten material from said container to decrease the volume of said molten material when said refractory body is lowered by said mechanical means and for supplying molten material to said container to increase the volume of said molten material when said refractory body is raised by said mechanical means, said removing and supplying means being operatively coupled to said means for raising and lowering of said refractory body such that the level of said molten material in said container remains constant as said refractory body is raised and lowered by said mechanical means.

2. The apparatus defined in claim 1, comprising means defining chambers hydraulically connected with the container in which the refractory body is arranged, the refractory body having projections extending underneath the level of the molten material, the projections extending into the chambers and being connected with the means for regulating the vertical position of the refractory body, said apparatus further comprising a plunger which has means to raise and lower said plunger into said body of molten material which is at least partially contained in said container to control the level of said molten material, said plunger being operatively coupled to said mechanical means.

3. The apparatus defined in claim 1, comprising projections on both sides of said refractory body forming a U-shaped passage for said glass stream, the projections being made of the same material as the refractory body and being connected with said mechanical means for effecting an adjustment in a vertical direction of the refractory body; and at least one vessel hydraulically connected with said container in which the refractory body is mounted, said vessel being capable of being raised and lowered for regulating the level of the molten material in said container, said vessel being operatively coupled to said mechanical means.

4. An apparatus in accordance with claim 1, comprising at least one vessel hydraulically connected with the container in which the refractory body is mounted, the vessel being capable of being raised and lowered for regulating the level of the molten material in the container, said vessel being operatively coupled to said mechanical means.

5. An apparatus in accordance with claim 1, comprising a plunger which has means for vertically raising and lowering said plunger into said body of molten material which is at least partially contained in the container.

6. An apparatus in accordance with claim 1, in which the body is a weir for controlling the flow of the glass, and said molten material is a metal.

7. An apparatus in accordance with claim 1, comprising means defining chambers hydraulically connected with the container in which the refractory body is arranged, the refractory body having projections extending underneath the level of the molten material, the projections extending into the chambers and being connected with the means for regulating the vertical position of the refractory body.

8. An apparatus in accordance with the claim 1, comprising projections on both sides of the refractory body forming a U-shaped passage for the glass flow, the projections being made of the same material as the refractory body and being connected with the means for effecting an adjustment in a vertical direction of the refractory body.

9. An apparatus in accordance with claim 1, provided with heat transfer means associated with the container.

References Cited
UNITED STATES PATENTS

| 3,231,351 | 1/1966 | Brichard | 65—182 |
| 2,677,003 | 4/1954 | Arbeit et al. | 65—347 |
| 3,323,890 | 6/1967 | Javaox | 65—182 |

ROBERT L. LINDSAY JR., Primary Examiner

U.S. Cl. X.R.

65—182 R, 343